Dec. 13, 1966   F. W. SPENCER   3,290,708
APPARATUS FOR CONDITIONING ARTICLES OF MANUFACTURE
Filed June 3, 1964   4 Sheets-Sheet 1
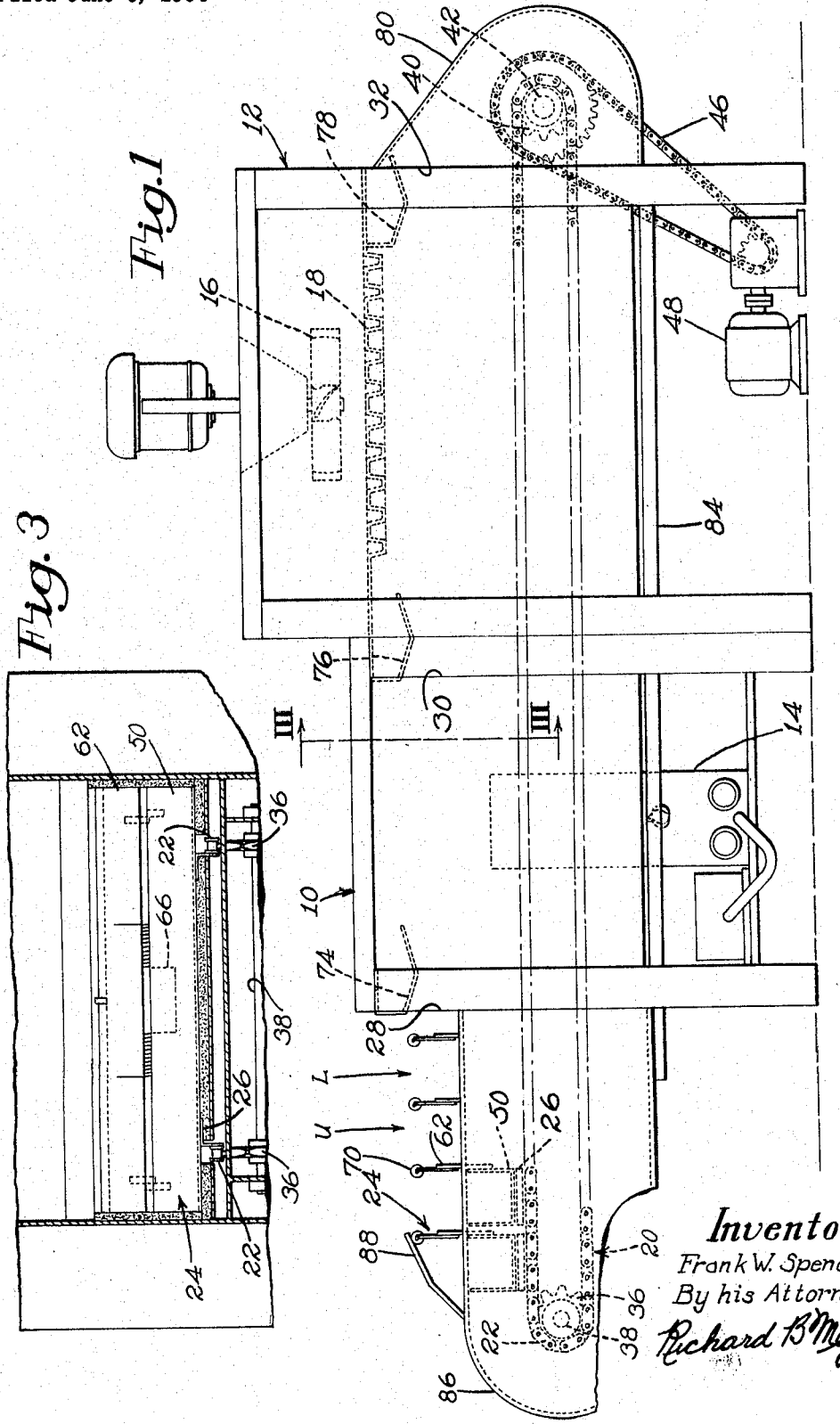
Inventor
Frank W. Spencer
By his Attorney
Richard B. Megley

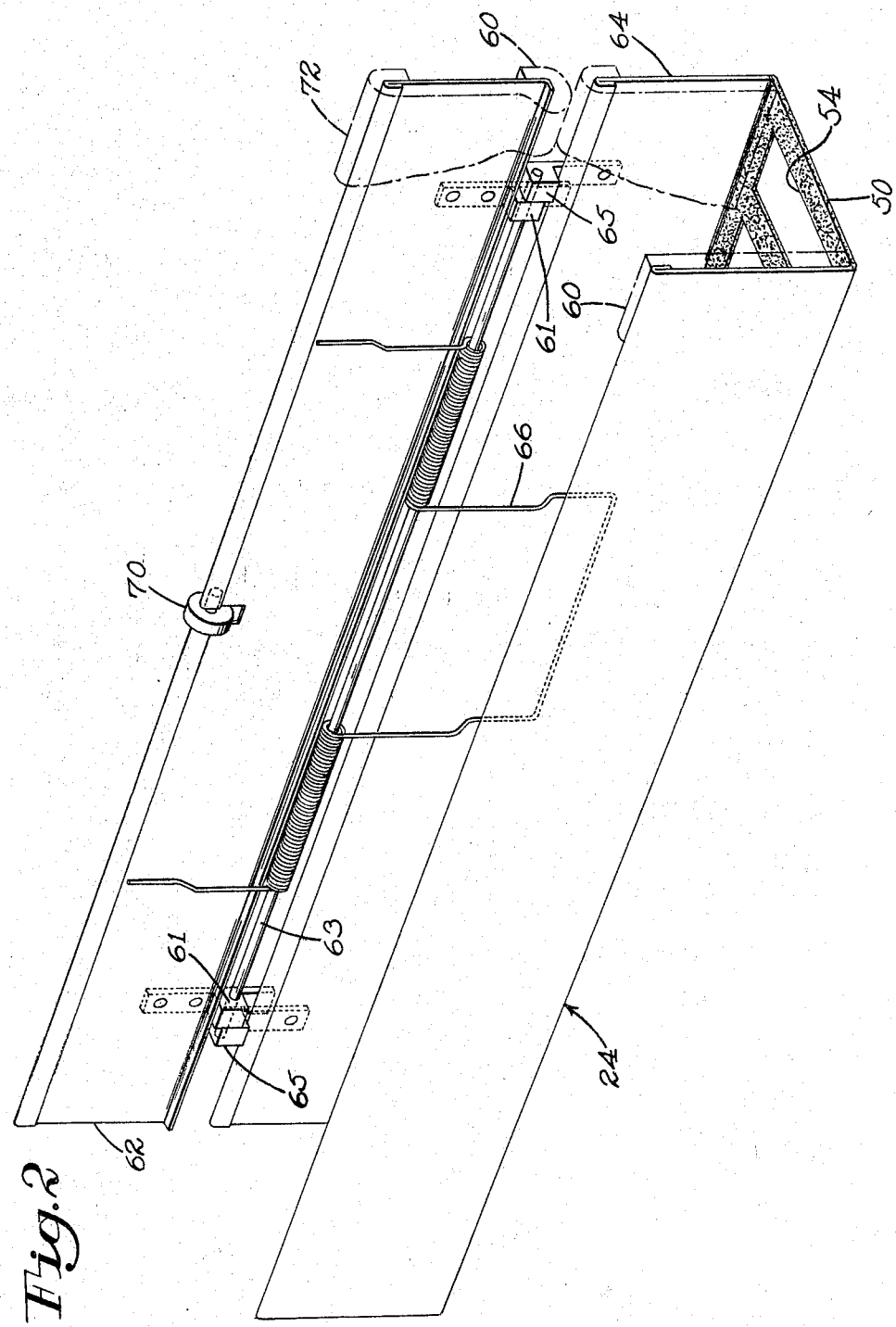

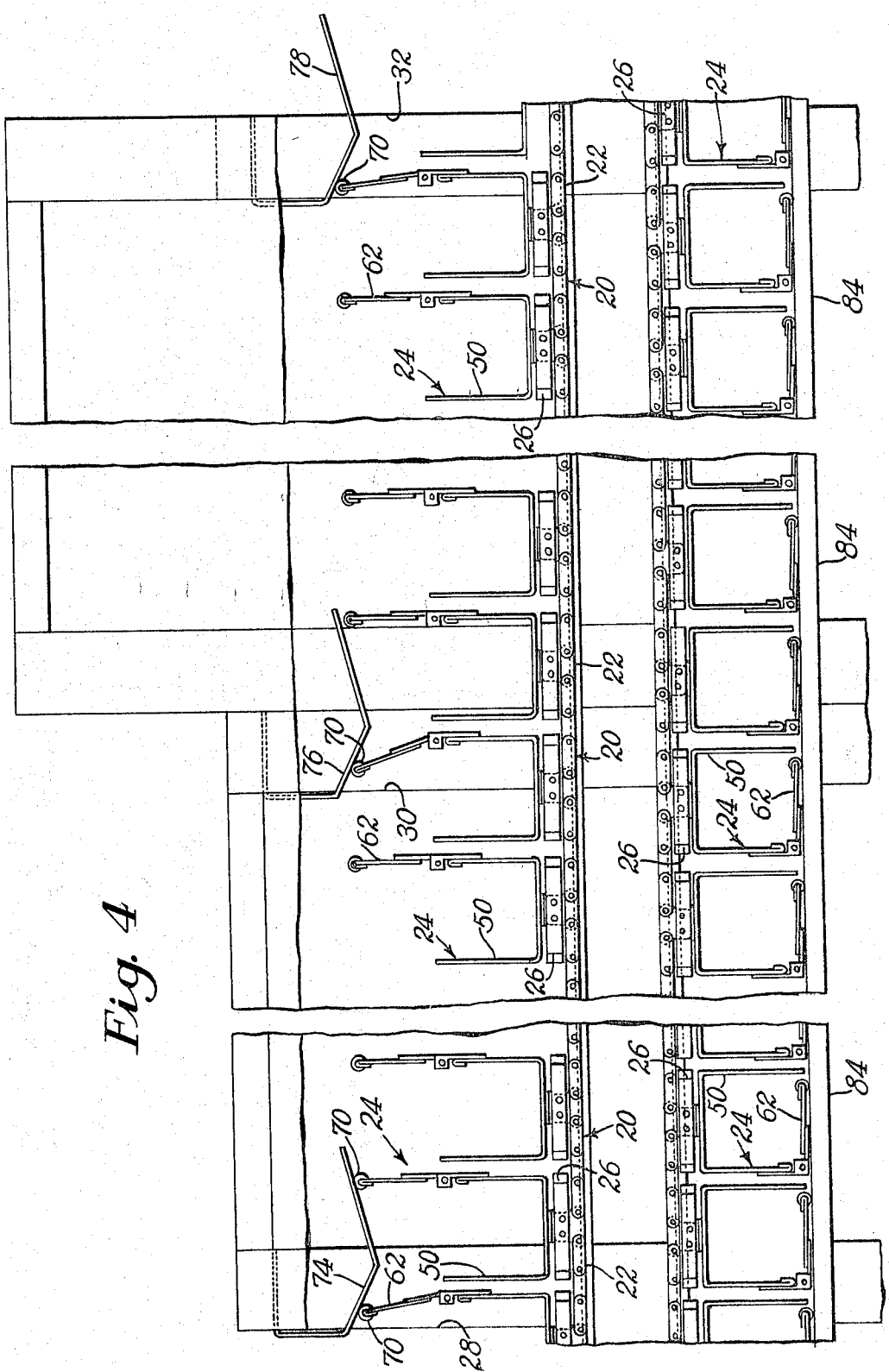

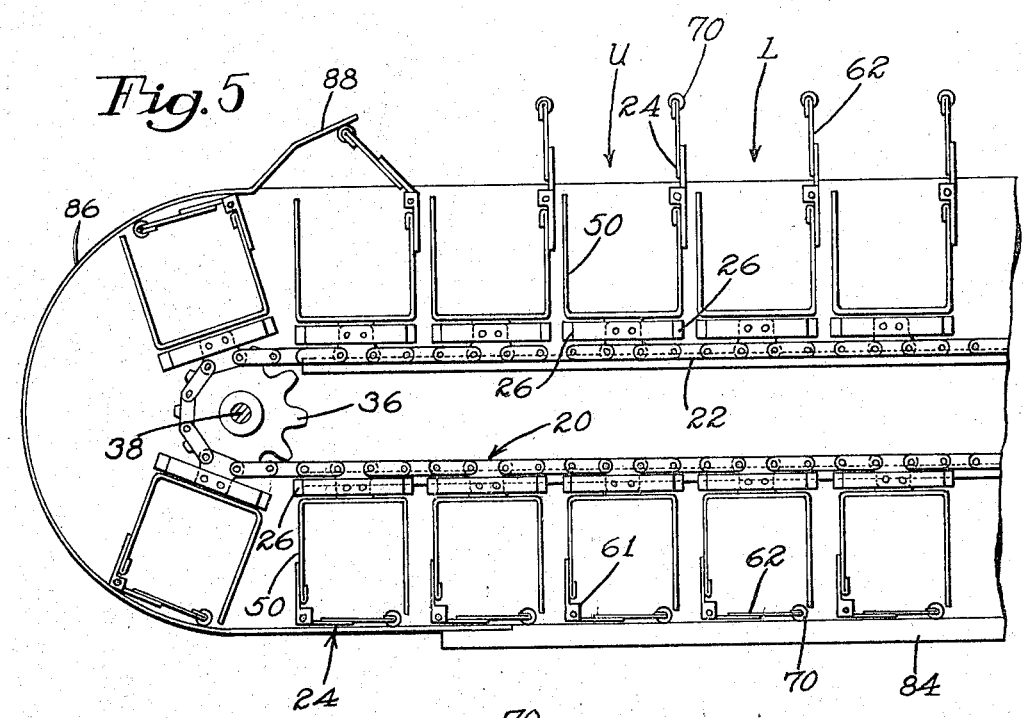
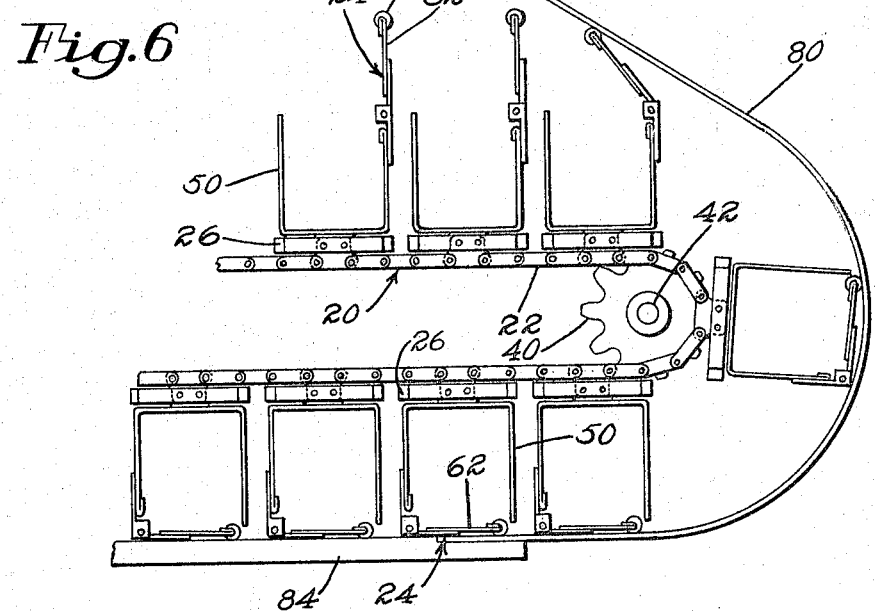

United States Patent Office 3,290,708
Patented Dec. 13, 1966

3,290,708
APPARATUS FOR CONDITIONING ARTICLES OF MANUFACTURE
Frank W. Spencer, Beverly, Mass., assignor to United Shoe Machinery Corporation, Flemington, N.J., a corporation of New Jersey
Filed June 3, 1964, Ser. No. 372,340
11 Claims. (Cl. 12—1)

This invention relates to apparatus for performing conditioning operations such as drying, shrinking, heating, heat-setting and the like on articles of manufacture. More specifically, this invention relates to improved apparatus with which a variety of analogous production operations, generally characterized by the use of controlled atmospheric conditions, can be accomplished more efficiently and qualitatively than with present apparatus. The invention is illustrated herein as embodied in apparatus for heat-setting shoe parts wherein heat and moisture are applied to the shoe parts in predetermined quantities and controlled ratios.

The efficiency with which conditioning operations of this type can be accomplished and the quality of the resulting product are totally dependent on the ability of the apparatus used to maintain the desired atmospheric condition at a prescribed level. Further, the complexity and size of the equipment required to attain and maintain a particular atmospheric condition is predicated on the integrity of the chamber of the apparatus in which the atmosphere is created, i.e. on the extent of escape of the created atmosphere through openings in the chamber. When the apparatus is automated to achieve high production, the difficulty in maintaining the required atmospheric condition is markedly enhanced. That is, when it is desired rapidly and continuously to introduce articles into the chamber in which the atmosphere has been created, the prevention of escape of the atmosphere is exceedingly difficult. Openings must be provided through which the articles of manufacture continuously may be fed. Yet, in order to prevent dilution of the required atmospheric condition, the openings must be continuously closed or sealed.

The problems discussed above are increased in complexity where it is desired sequentially to subject articles of manufacture to a plurality of different atmospheric conditions. This is particularly true where the articles must pass from one chamber of the apparatus directly into another chamber. A passageway or opening must be provided between the abutting chambers. However, the different atmospheres in the chambers cannot be permitted to intermingle or the individual character of each would be destroyed. The heat-setting of shoes by the method described in copending application for Letters Patent of the United States, Ser. No. 309,417, filed Sept. 17, 1963, in the name of Mieth Maeser and now Patent No. 3,176,333 illustrates a method of conditioning wherein this problem is encountered. In this method a previously mulled, lasted upper is first heated in a hot moist atmosphere and then dried in a high-temperature dry atmosphere. The second step in this method must immediately follow the first in order to obtain the maximum beneficial effects of the method. Thus, apparatus for practicing the method must provide adjacent chambers having a common opening so that a lasted upper can pass from the first step directly to the second. The passageway or opening between the chambers must be continuously closed or sealed, however, to prevent moisture from the wet section from permeating the dry section.

Apparatus taught by the prior art for performing conditioning operations of the type described above commonly employed an endless conveyor having a plurality of open-ended support carriages mounted thereon for continuously introducing articles of manufacture to the conditioning chamber(s) of the apparatus. The carriages were normally loaded immediately prior to movement into the conditioning chamber(s) and unloaded immediately after emerging. The empty carriages were returned to the loading position by the inoperative portion of the conveyor cycle.

Economic use of automated apparatus of this type often depends upon the ability of a single operator to run the machine. This dictates that the loading and unloading operations be performed at the same location. A ready solution to this problem would seem to be the use of a closed carriage on the endless conveyor of the prior art, the conveyor lying in a vertical plane. Thus, an article to be conditioned could be inserted into the closed carriage in an upright position and conveyed through the conditioning chamber(s). When the direction of the conveyor was reversed by a sprocket or the like, the article would tumble into an upside-down position but would be supported by a cover portion of the proposed closed carriage. Upon the return of the conveyor to its initial direction by a second sprocket or the like, the article would tumble into the upright position and be in location for unloading. However, due to the nature of the operation performed by the subject apparatus, a closed carriage cannot be employed. The carriage must permit the flow of the conditioning atmosphere around the article to be conditioned. Any obstruction to such flow represents a deterrent to successful operation of the machine. Thus, use of a continuously closed carriage would have an adverse influence on the operation of the apparatus and, therefore, cannot be considered as a possible solution to this problem. Further, since the atmospheres employed are generally hot, metallic gratings or the like cannot be utilized as a retaining cover as the heated article would be scarred or burned upon contact with such.

Accordingly, it is an object of this invention to provide automated conditioning apparatus having a conditionng chamber into which articles of manufacture may be consecutively and rapidly fed but which is continuously sealed to prevent escape of the conditioning atmosphere.

It is a further object of the above to provide automated conditioning apparatus having a plurality of conditioning chambers through which articles of manufacture may be sequentially fed without permitting intermingling of the distinctive atmospheres within the plurality of chambers.

A still further object of this invention is to provide conveyorized conditioning apparatus which can be loaded and unloaded at the same position by a single operator.

To these ends and in accordance with a feature of this invention there is provided apparatus for conditioning articles of manufacture comprising a chamber having ingress and egress openings, a conveyor for moving the articles through the chamber, a plurality of carriages mounted on the conveyor to receive an article of manufacture, each of the carriages comprising an elongated member extending transversely of the conveyor and outwardly therefrom, and means mounted in the chamber openings cooperative with said elongated members continuously to seal the chamber.

There is also provided in accordance with a further feature of this invention, conditioning apparatus of the type just described comprising an endless conveyor chain having a plurality of carriages mounted thereon, each of said carriages having a pivotal cover, means normally biasing the pivotal cover into an open position, and means for closing the cover during a portion of the conveyor cycle.

The above and other features of the invention including various novel details of construction and combinations of parts will now be more particularly described with reference to the accompanying drawings and pointed out in the claims. It will be understood that the machine embodying the invention is shown by way of illustration and not as a limitation of the invention. The principles and features of this invention may be utilized in varied and numerous embodiments without departing from the scope of the invention.

In the drawings:

FIG. 1 is a partial view in front elevation of a conditioning apparatus embodying the invention, this view merely intended generally to illustrate specific conditioning apparatus with which the invention can be combined;

FIG. 2 is a detail view, in perspective, of a carriage embodying certain features of this invention;

FIG. 3 is a section view taken along the line III—III of FIG. 1;

FIG. 4 is a series of views of the conveyor means embodying the invention at various stages of progress through the conditioning apparatus illustrated in FIG. 1;

FIG. 5 is an enlarged front elevation of the left-hand end of FIG. 1 with the front cover of the apparatus removed;

FIG. 6 is an enlarged front elevation of the right-hand end of FIG. 1 with the front cover of the apparatus removed.

The apparatus illustrated in FIG. 1 is adapted for practice of the method disclosed in the above referenced patent of Maeser. The present invention will be described hereinafter with reference to FIG. 1 as a convenient means of showing the outstanding features thereof, it being clearly understood that the invention is equally applicable to any conditioning apparatus having a chamber in which a controlled atmospheric condition is maintained.

As shown in FIG. 1, the apparatus comprises two enclosed chambers indicated by the reference characters 10 and 12, respectively. A hot moist atmosphere is maintained in the chamber 10 by any convenient means such as a boiler 14 and the appurtenant ducts. Heaters (not shown), a fan 16, and a plurality of nozzles 18 are used to direct high-temperature air onto an article passing through the chamber 12. Leakage of air through access openings in the lower portion of the chamber 12 prevents the build up of excess moisture in the chamber 12, i.e. moisture evaporated from the articles being conditioned.

Articles of manufacture such as shoes are sequentially passed through the chambers 10 and 12 by conveyor means 20 comprising two spaced endless conveyor chains 22, 22, see FIG. 3. A plurality of carriages 24, opposite ends of which are mounted on transversely alined lugs 26, 26 secured to the respective conveyor chains 22, 22, are used to support the shoes to be conditioned. The conveyor chains 22, 22 feed the carriages 24 through an ingress opening 28 in the chamber 10, through an opening 30 common to the abutting chambers 10 and 12, and out of the chamber 12 through an egress opening 32. The left hand ends of the conveyor chains 22, 22, as viewed in FIG. 1, are supported on sprockets 36, 36, respectively, mounted on a shaft 38. The conveyor chains 22, 22 are driven by sprockets 40, 40 mounted on a shaft 42 located at the right hand end of the apparatus, as viewed in FIG. 1. Rotative movement is imparted to the sprockets 40, 40 by a drive chain 46 driven by a motor 48.

The construction of the carriages 24 is illustrated fully in FIG. 2, certain details of construction having been omitted in the other figures to attain clarity. The carriages 24 each comprise a generally U-shaped main body portion 50 mounted on the lugs 26, 26, see FIGS. 3–6. The bottom of the carriages 24 must be open to facilitate circulation of the atmospheres in the chambers 10 and 12 about the shoes, as discussed above. Accordingly, the bottom of the carriages 24, may be provided with a plurality of apertures 54 or, in the alternative, may be constructed of heavy wire mesh or the like. The bottom of the carriages 24 are coated with nylon to prevent burning or scarring the outsole of a shoe positioned thereon.

It is to be noted that, in the practice of this method of conditioning, a lasted upper is placed in the carriage with the bottom or outsole of the shoe in engagement with the bottom of the carriage. The outsole or bottom is less susceptible to damage from such contact than is the upper and, therefore, permits such construction.

The upstanding sides of the U-shaped member 50 are covered with polyurethane foam siding 60, 60. The siding 60, 60 will not burn or scar the upper leather when the lasted upper is accidently contacted or is supported by the sides of the carriage during certain portions of the conveyor cycle, as hereinafter described.

Each of the carriages 24 is provided with a pivotal wall or cover 62 mounted on blocks 61, 61 which are rotatively mounted on a rod 63 secured to the right hand side 64 of the member 50 by mounting blocks 65, 65. The cover is normally biased open into an upper position extending essentially along a line perpendicular to the conveyor means 20 in alinement with the side 64 of the U-shaped member 50 by a spring 66. Clockwise movement of the cover, as viewed in FIG. 2, is limited by engagement of extensions of the mounting blocks 61, 61 depending below the rod 63 with the side 64 of the U-shaped member 50. The spring 66 is mounted on the rod 63, opposite ends thereof extending outwardly in front of the cover 62 and the central portion downwardly in front of the side 64 of the member 50. Centrally located roller cams 70 are provided on the upper edge of each cover 62. The covers are also fitted with polyurethane foam siding 72.

The access openings 28, 30 and 32 through which the shoes are fed by the conveyor means 20 are provided with depending sealing cams 74, 76 and 78, respectively, mounted on the upper surface thereof. The sealing cams 74, 76 and 78 cooperate with the covers 62 to provide a continuous seal to prevent escape of the atmospheres created in the chambers 10 and 12, as hereinafter described. The sealing cams 74, 76 and 78 comprise generally flattened V-shaped, elongated members extending longitudinally across the entire length of the upper portion of the respective openings.

In the operation of the apparatus, a shoe to be conditioned is loaded in one of the carriages 24 at a loading station L. The conveyor means 20 feeds the shoe from left to right, as viewed in FIGS. 1 and 4, to the ingress opening 28 where the roller cam 70 of the cover 62 engages the left-hand end of the sealing cam 74, see particularly FIG. 4. The siding 72 extends above the upper, terminal portion of the cover 62 a sufficient distance such that it will engage the sealing cam 74 simultaneously with the roller cam 70. The widths of the elongated carriage 24 and cover 62 thereof are only slightly smaller than the width of the opening 28 thus providing a substantial seal. The sides of the openings 28, 30 and 32 are padded with polyurethane foam or the like to compensate for the difference in the widths of the carriage 24 and the openings 28, 30 and 32 thereby to provide a complete seal when the carriage 24 is positioned in the openings. The siding 60 and 72 on the sides 64 and cover 62 of the carriage 24 provide a continuously sealed surface.

Further progress of the carriage 24 into the chamber 10 causes the cover 62 to be pivoted counterclockwise against the action of the spring 66 as a result of engagement of the roller cam 70 with the depending V-shaped sealing cam 74. A tight seal is thus established between the siding 72 and the sealing cam 74, the remainder of the opening 28 being sealed by the polyurethane padding and the U-shaped member 50 as described above. As the carriage 24 passes further into the chamber 10, the roller cam 70 passes over the bottom or apex of the V-shaped cam 74 and starts up the opposite incline under the action of the spring 66. Before the cover 62 is returned to the open position described above, the next following carriage 24 will have moved into position to establish a seal with the left hand end of the sealing cam 74 as just described. Thus, a cover 62 is always in engagement with the sealing cam 74 and a continuous seal is provided. The carriages 24 and covers 62 mounted thereon cooperate in a similar manner with the sealing cams 76 and 78.

When the carriage 24 emerges from the egress opening 32, the cover 62 must be closed to provide a support for the shoe during the return of the carriage. That is, when the conveyor means 20 and carriage 24 thereon pass around the sprockets 40, 40 the carriage will be turned upside down. Accordingly, the cover 62 must be closed to prevent the shoe from falling out. As illustrated in FIG. 6, closure of the cover 62 is accomplished by a terminal camming housing 80 mounted on the frame of the chamber 12. The camming housing 80 engages the roller cam 70 and pivots the cover 62 into a closed position as the conveyor 20 and carriage 24 thereon pass over the sprockets 40, 40. During passage over the sprockets 40, 40, the shoe is supported on the side of the U-shaped member 50. The shoe is in physical engagement with polyurethane siding 60 covering the sides of the member 50 and, thus, is not burned or scarred. When the carriage has passed over the sprockets 40, 40 and is upside down, the shoe is supported by the engagement of the lasted upper with the cover 62. The polyurethane siding 72 on the cover 62 prevents burning or scarring of the lasted upper. The cover 62 is retained in the closed position during the return of the carriage by a camming bar 84 mounted in the frame of the apparatus which engages the roller cam 70.

Upon completion of the return of the carriage 24, the conveyor means 20 and carriage 24 thereon pass over the sprockets 36, 36 and the cover 62 is opened by the spring 66 as the carriage emerges from a second camming housing 86 extending outwardly from the frame of the chamber 10. The camming housing 86 is provided with an end portion 88 which engages the roller cam 70 and allows the cover 62 to open gradually. The functioning of the camming housing 86 is generally analogous to that of the camming housing 80 and, therefore, will not be described in detail. The shoe is unloaded at an unloading station U located in front of the loading station L.

A cycle of operations can thus be completed without significant loss or intermingling of the atmospheres in the chambers 10 and 12 and without damaging the heated upper leather. Further, the apparatus can be run by a single operator positioned at the adjacent unloading station U and loading station L.

Having thus described my invention, what I claim as new and desire to secure by Letters Patent of United States is:

1. Apparatus for conditioning articles of manufacture comprising a chamber having ingress and egress openings therein, a conveyor for moving the articles through said chamber, a plurality of carriages mounted on said conveyor to receive and support the articles of manufacture, each of said carriages comprising a base member and a wall member mounted on said base member for movement relative thereto, means normally biasing said wall members into an upper position defined by a plane which intersects the conveyor, and means in said openings cooperative with said wall members continuously to seal said chamber.

2. Apparatus for conditioning articles of manufacture comprising a chamber having ingress and egress openings therein, a conveyor for moving the articles through said chamber, a plurality of carriages mounted on said conveyor to receive and support the articles of manufacture, each of said carriages comprising a base member and an elongated member pivotally mounted on said base member, said pivotal member extending transversely of said conveyor, means normally biasing said pivotal members into an upper position defined by a plane which intersects the conveyor, and means mounted in said openings cooperative with said pivotal members continuously to seal said chamber.

3. Apparatus for conditioning articles of manufacture comprising a chamber having ingress and egress openings therein, a conveyor for moving the articles through said chamber, a plurality of carriages mounted on said conveyor to receive and support the articles, each of said carriages comprising a base member and an elongated member pivotally mounted on said base member, said base member and pivotal member having siding thereon to protect an article positioned in the carriage and to seal said openings when the carriage is located therein, means normally biasing said pivotal members into an upper position defined by a plane which intersects the conveyor, and means mounted in said openings engageable with said pivotal members to urge said pivotal members out of said upper position during passage of the carriage through said openings thereby continuously to seal said openings.

4. Apparatus for conditioning articles of manufacture comprising a chamber having ingress and egress openings therein, a conveyor for moving the articles through said chamber, a plurality of carriages mounted on said conveyor in spaced relation to receive and support the articles, the spacing of the carriages being such as continuously to position one or more of said carriages in said openings, each of said carriages comprising a base member and a wall member mounted thereon for movement relative thereto, means normally biasing said wall members into an upper position defined by a plane which intersects the conveyor, and sealing means mounted in said openings engageable with said wall members to urge said wall members out of said upper position during passage of the carriages through said openings thereby continuously to seal said openings.

5. Apparatus for conditioning articles of manufacture comprising a chamber having ingress and egress openings therein, a conveyor for moving the articles through said chamber, a plurality of carriages mounted on said conveyor in spaced relation to receive and support the articles, the spacing of the carriages being such as to continuously position one or more of said carriages in said openings, each of said carriages comprising a base member and a member pivotally mounted thereon, means normally biasing said pivotal members into an upper position defined by a plane which intersects the conveyor, and sealing means mounted in said openings engageable with said pivotal members to urge said pivotal members out of said upper position during passage of the carriages through said openings thereby continuously to seal said openings, said sealing means comprising depending members having inclined cam surfaces extending therefrom.

6. Apparatus for conditioning articles of manufacture comprising a chamber having ingress and egress openings therein, an endless conveyor for moving the articles through said chamber, a plurality of carriages mounted on said conveyor in spaced relation to receive and support articles of manufacture, the spacing of the carriages being such as to continuously position one or more of said carriages in each of said openings, each of said carriages comprising a generally U-shaped base member and a cover pivotally mounted thereon, means normally biasing said pivotal covers into an upper position defined by a plane which intersects the conveyor, means mounted in said openings cooperative with said pivotal covers continuously to seal said chamber, means for closing said pivotal covers after passage of the carriages through said chamber prior to the return of said carriages to a loading position by said endless conveyor, said closing means permitting opening of said covers by said biasing means upon return of said carriages to the loading position.

7. Apparatus for conditioning articles of manufacture comprising a chamber having ingress and egress openings therein, an endless conveyor for moving the articles through said chamber, a plurality of carriages mounted on said conveyor in spaced relation to receive and support articles of manufacture, the spacing of the carriages being such as to continuously position one or more of said carriages in each of said openings, each of said carriages comprising a generally U-shaped base member and a cover pivotally mounted thereon, said base member and said pivotal cover having siding thereon to protect an aritcle positioned in the carriage and to seal said openings when the carriage is located therein, means normally biasing said pivotal covers into an upper position defined by a plane which intersects the conveyor, sealing means mounted in said openings engageable with said pivotal covers to urge said pivotal covers out of said upper positions during the passage of the carriages through said openings thereby continuously to seal said openings, said sealing means comprising depending members having an inclined cam surface extending therefrom, means for closing said pivotal covers after passage of the carriages through said chamber prior to return of said carriages to a loading position by said endless conveyor, said means permitting opening of said cover by said biasing means upon return of said carriages to the loading position.

8. Apparatus for conditioning articles of manufacture comprising a chamber having ingress and egress openings therein, an endless conveyor for moving the articles through said chamber, a plurality of carriages mounted on said conveyor in spaced relation to receive and support articles of manufacture, the spacing of the carriages being such as to continuously position one or more of said carriages in each of said openings, each of said carriages comprising a base member and a wall movably mounted thereon, means normally biasing said movable walls into an upper position defined by a plane which intersects the conveyor, sealing means mounted in said openings engageable with said movable walls to urge said movable walls out of said upper position during passage of the carriages through said openings thereby continuously to seal said openings, said sealing means comprising depending members having an inclined cam surface extending therefrom, means for closing said movable walls after passage of the carriages though said chamber prior to the return of said carriages to the loading position by said endless conveyor, said means permitting opening of said walls by said biasing means upon return of said carriages to the loading position.

9. Apparatus for heat-setting lasted shoe uppers comprising a first chamber having a hot-moist atmosphere therein and a second chamber having a high temperature dry atmosphere therein, said first and second chambers having ingress and egress openings therein, an endless conveyor for moving lasted shoe uppers through said chambers, a plurality of carriages mounted on said conveyor in spaced relation to receive and support the lasted shoe uppers, the spacing of the carriages being such as continuously to position one or more of said carriages in each of said openings, each of said carriages comprising a base member and a member pivotally mounted thereon, said base member and pivotal member having siding thereon to protect a lasted shoe upper position in the carriage and to seal said openings when the carriage is located therein, means normally biasing said pivotal members into an upper position defined by a plane which intersects the conveyor, and means mounted in said openings engageable with said pivotal members to urge said pivotal members out of said upper position during passage of the carriage through said openings thereby continuously to seal said openings.

10. Apparatus for heat-setting lasted shoe uppers comprising a first chamber having a hot-moist atmosphere therein and a second chamber having a high temperature dry atmosphere therein, said first and second chambers having ingress and egress openings therein, an endless conveyor for moving lasted shoe uppers through said chambers, a plurality of carriages mounted on said conveyor in spaced relation to receive and support the lasted shoe uppers, the spacing of the carriages being such as continuously to position one or more of said carriages in each of said openings, each of said carriages comprising a generally U-shaped base member and a cover pivotally mounted thereon, said base member and pivotal cover having siding thereon to protect an article positioned in the carriage and to seal said openings when the carriage is located therein, means normally biasing said pivotal covers into an upper position defined by a plane which intersects the conveyor, sealing means mounted in said openings engageable with said pivotal covers to urge said pivotal covers out of said upper position during passage of the carriages through said openings' thereby continuously to seal said openings, means for closing said pivotal covers after passage of the carriages through said chambers prior to return of said carriages to a loading position by said endless conveyor, said means permitting opening of said covers by said biasing means upon return of said carriages to the loading position.

11. Apparatus for heat-setting lasted shoe uppers comprising a first chamber having a hot-moist atmosphere therein and a second chamber having a high temperature dry atmosphere therein, said first and second chambers having ingress and egress openings therein, an endless conveyor for moving lasted shoe uppers through said chambers, a plurality of carriages mounted on said conveyor in spaced relation to receive and support the lasted shoe uppers, the spacing of the carriages being such as continuously to position one or more of said carriages in each of said openings, each of said cariages comprising a base member and a wall movably mounted thereon, said base member and wall having siding thereon to protect a lasted shoe upper position in the carriage and to seal said openings when the carriage is located therein, means normally biasing said movable walls into an upper position defined by a plane which intersects the conveyor, and means mounted in said opening engageable with said movable walls to urge said movable walls out of said upper position during passage of the carriage through said openings thereby continuously to seal said openings.

References Cited by the Examiner
UNITED STATES PATENTS

| | | | |
|---|---|---|---|
| 1,830,114 | 11/1931 | Kinney | 12—1 X |
| 2,671,456 | 3/1954 | Schultz et al. | 12—1 X |
| 3,070,216 | 6/1958 | Robson | 198—131 |
| 3,237,227 | 3/1966 | Bromfield | 12—1 X |

FOREIGN PATENTS

| | | |
|---|---|---|
| 1,178,772 | 5/1959 | France. |

PATRICK D. LAWSON, *Primary Examiner.*